United States Patent [19]

Satoh

[11] Patent Number: 4,959,691

[45] Date of Patent: Sep. 25, 1990

[54] MAGNETIC BRUSH FORMING DEVICE FOR IMAGE GENERATING APPARATUS

[75] Inventor: Tsumori Satoh, Yokosuka, Japan

[73] Assignee: Ricoh Company, Ltd., Tokyo, Japan

[21] Appl. No.: 281,753

[22] Filed: Dec. 9, 1988

[30] Foreign Application Priority Data

Dec. 11, 1987 [JP] Japan ................................ 62-313490
Mar. 24, 1988 [JP] Japan ................................ 63-068300

[51] Int. Cl.⁵ ............................ G03B 9/40; G03B 9/06

[52] U.S. Cl. ................................ 355/246; 15/256.51; 355/251; 355/305

[58] Field of Search ............... 355/246, 251, 271, 305, 355/302, 296; 15/1.5 R, 1256.51, 256.52

[56] References Cited

U.S. PATENT DOCUMENTS

| | | | |
|---|---|---|---|
| 4,515,467 | 5/1985 | Suzuki | 355/305 |
| 4,524,088 | 6/1985 | Fagen, Jr. et al. | 355/246 |
| 4,547,063 | 10/1985 | Stange | 355/305 |
| 4,723,144 | 2/1988 | Silverberg | 355/251 |
| 4,740,814 | 4/1988 | Folkins | 355/202 |

FOREIGN PATENT DOCUMENTS 61-203757 12/1986 Japan .

*Primary Examiner*—Timothy V. Eley

*Attorney, Agent, or Firm*—Oblon, Spivak, McClelland, Maier & Neustadt

[57] ABSTRACT

An image generating apparatus such as an electrophotographic copying machine includes, around a belt-like or drum-like photosensitive body, a magnetic brush developing device for developing an electrostatic latent image on the photosensitive body into a visible image, and a magnetic brush cleaning device for removing remaining toner from the photosensitive body after the visible image has been transferred onto a transfer sheet, thus readying the photosensitive body for a next cycle of forming an electrostatic latent image thereon. Ech of the magnetic brush cleaning and developing devices has a brush carrier for carrying an agent containing a carrier and a toner as a magnetic brush and for bringing the magnetic brush into contact with the photosensitive body. The brush carrier is associated with a limiting member for squeezing the layer of the agent to keep the layer thickness uniform on the brush carrier. When the agent is squeezed, it is heated, and if it were overheated, the carrier and the toner would be thermally fused to each other, lowering the cleaning or developing capability. To prevent this problem, the limiting member is of a hollow satructure for allowing air to flow therein. For more efficient cleaning or developing operation, the brush carrier may also be of a hollow structure for cooling the same with air.

12 Claims, 9 Drawing Sheets

MAGNETIC BRUSH FORMING DEVICE FOR IMAGE GENERATING APPARATUS

BACKGROUND OF THE INVENTION

The present invention relates to a magnetic brush forming device for use an image generating apparatus for generating a visible image by developing an electrostatic latent image with toner.

There have been known image generating apparatus for developing an electrostatic latent image on a latent image carrier into a visible image with toner in a developing device, transferring the visible image onto a transfer member, and cleaning remaining toner from the latent image carrier with a cleaning device. Such an image generating apparatus may be employed in an electrophotographic copying machine, a printer, a facsimile transmitter/receiver, or the like. It is also widely known to employ a magnetic brush forming device as the developing device or the cleaning device of the type described above, and these devices are generally referred to respectively as a magnetic brush developing device and a magnetic brush cleaning device. In the magnetic brush developing device, a brush carrier carries a developing agent for developing a latent image into a visible image. In the magnetic brush cleaning device, a brush carrier carries a cleaning agent for cleaning toner away from the latent image carrier.

The agent, which may be a developing agent or a cleaning agent, is carried as a layer on the brush carrier in the magnetic brush forming apparatus, and the thickness of the layer is limited or controlled by a limiting member. When the layer thickness is limited by the limiting member, the layer of the agent is squeezed by the limiting member, producing heat due to physical contact between the layer and the limiting member. Therefore, the temperature of the agent is increased to cause toner to be fused with time to the surface of carrier particles in the agent. When such fusion of the toner takes place, the ability of the magnetic brush cleaning device to clean remaining toner from the latent image carrier is lowered, and the latent image carrier in the magnetic brush developing apparatus tends to bring about undesirable toner deposits or "scumming" thereon.

The magnetic brush developing device and the magnetic brush cleaning device each employ a magnet roll comprising a sleeve with its outer circumferential portion made of a nonmagnetic material and a magnet loosely fitted in the sleeve.

The magnet roll is operated in one of the following modes: (1) The sleeve is rotated and the magnet is fixed. (2) The magnet is rotated and the sleeve is fixed. (3) Both the sleeve and the magnet are rotated. In each of these operating modes, the sleeve and the magnet produce relative movement therebetween, i.e., they are relatively rotated or moved.

Utilizing the relative rotation of the sleeve and the magnet, a magnetic brush is caused to roll on the outer circumferential surface of the sleeve to either supply toner to a photosensitive body in the magnetic brush developing device or remove remaining toner from a photosensitive body in the magnetic brush cleaning device.

In order to achieve the relative rotation of the sleeve and the magnet, the sleeve or the magnet or both are rotatably supported in various supporting arrangements. Two conventional arrangements for supporting the sleeve and the magnet to allow their relative rotation will be described below.

According to one system, the outer circumferential portion of the sleeve at its opposite ends is rotatably supported on side plates, and a gear is fixed to an extension of the outer circumferential portion of the sleeve at one end for transmitting rotary motion to the sleeve. A magnet support shaft is rotatably supported centrally on flanges on the opposite ends of the sleeve, and has one end extending outwardly from the flange and fixed to a stationary member.

According to another structure, the outer circumferential portion of the sleeve at one end thereof is rotatably supported on a side plate, and a gear is fixed to an extension of the supported outer circumferential portion of the sleeve for transmitting rotary motion to the sleeve. A magnet support shaft is rotatably supported centrally on flanges on the opposite ends of the sleeve. The magnet support shaft extends outwardly from the flange at the other end of the sleeve and is fixed to a side plate to support the other end of the sleeve.

In each of the above support arrangements, the magnet is fixedly mounted on the magnet support shaft, and the sleeve is rotatable with respect to the fixed magnet. The flanges on the opposite ends of the sleeve serve to virtually close the inner space of the sleeve.

The magnet roll generally produces heat due to (1) friction between the sleeve and the developing agent (carrier and toner), (2) an eddy current produced upon relative movement of the sleeve (made of metal) and the magnet, and (3) heat transfer from another unit such as a fixing heater.

When the magnet roll is heated, it thermally fuses the developing agent which contains a synthetic resin component. Such thermal fusion should be avoided as it would largely impair the developing o cleaning capability of the magnetic roll.

However, with the aforesaid conventional support schemes, the inner space of the sleeve is fully closed and tends to store heat therein. Since the heat stored in the sleeve cannot easily be dissipated, it is responsible for lessening the developing or cleaning capability.

SUMMARY OF THE INVENTION

It is an object of the present invention to provide a magnetic brush forming device for use in an image generating apparatus, the magnetic brush forming device having a simple means for preventing or suppressing thermal fusion of toner which would otherwise be caused by the excessive heating of an agent comprising a carrier and a toner and carried on a brush carrier which forms a magnetic brush of the agent and carries the magnetic brush.

To achieve the above object, a limiting member for limiting or controlling the thickness of a layer of the agent is of a hollow structure for allowing air to flow therein thereby to air-cool the limiting member to radiate or dissipate heat therefrom.

Where the magnetic brush forming device of the invention is incorporated in a magnetic brush cleaning device, the ability of the magnetic brush cleaning device to clean remaining toner is prevented from being lowered due to overheating of the heat. Where the magnetic brush forming device is employed in a magnetic brush developing device; the ability of the magnetic brush developing device is prevented from being weakened due to overheating of the heat.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
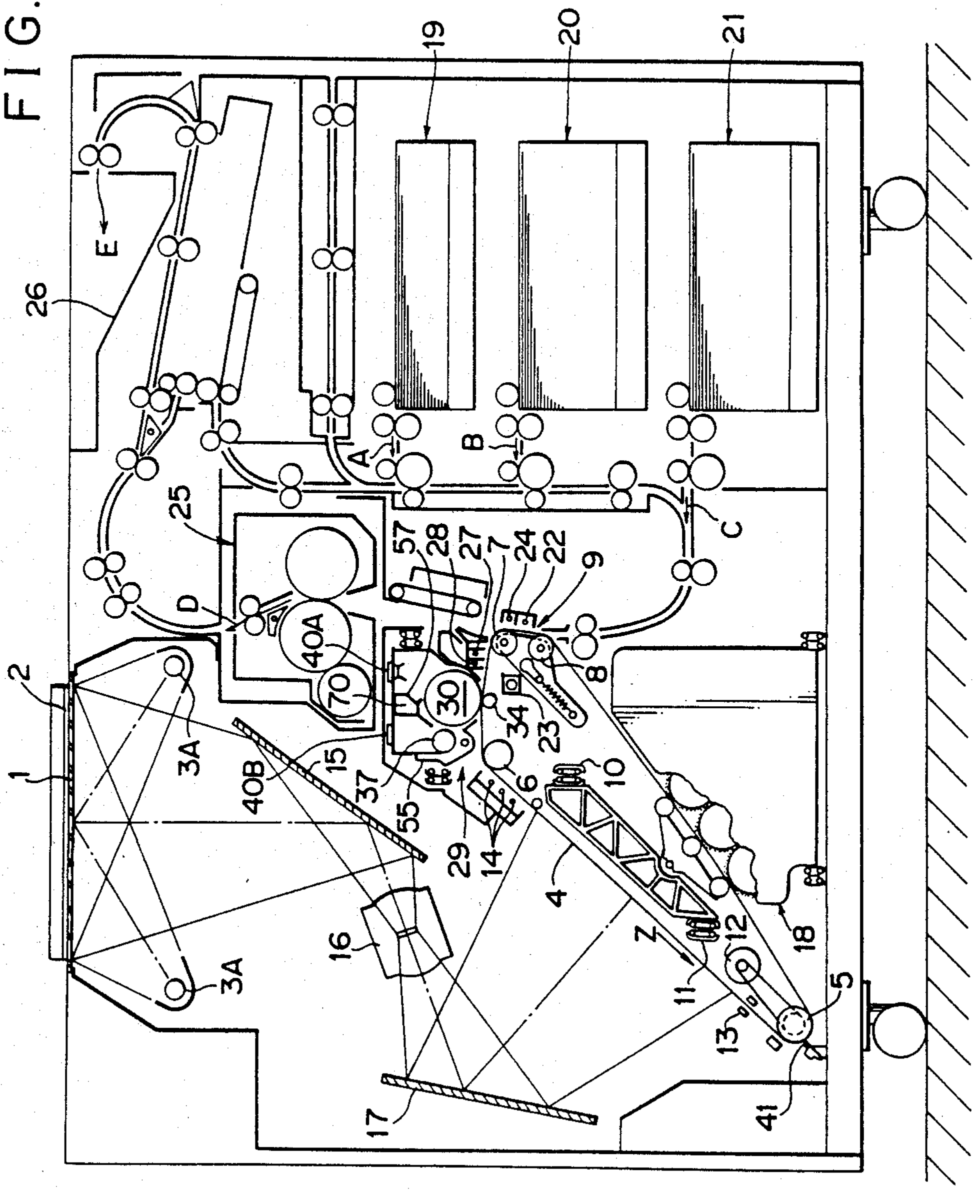
FIG. 1 is a schematic vertical cross-sectional view of an electrophotographic copying machine.

FIG. 1 shows an image generating apparatus or an electrophotographic copying machine incorporating a magnetic brush cleaning device according to the present invention. For a fuller understanding of the present invention, the electrophotographic copying machine will first briefly be described.

The copying machine includes a contact or support glass panel 1 fixedly mounted on its upper frame for placing an original 2 to be duplicated thereon. The entire lower surface of the original 2 is instantaneously illuminated by light sources (flash lamps) 3A, 3B and reflects light bearing an entire image on the lower surface of the original 2 onto a latent image carrier 4 comprising an endless-belt photosensitive body. Thus, copying machine is of the simultaneous entire-surface exposure type. The endless-belt photosensitive body 4 is trained around a driver roller 5 and three driven rollers 6, 7, 8. The endless belt photosensitive body 4 is tensioned by a spring. The photosensitive body 4 and associated parts jointly constitute a photosensitive unit which can be pulled laterally out of the copying machine along upper and lower slide rails 10, 11. The photosensitive unit includes rollers having shaft ends rotatably supported on front and rear side plates (not shown) of the photosensitive unit. The rear unit side plate supports thereon a drive motor 12 for enabling the driver roller 5 to drive the photosensitive body 4.

When starting a copying cycle, the drive motor 12 is energized to rotate the photosensitive body 4 in the direction of the arrow A, and also a main motor (not shown) is energized to start operating a sheet feeding unit, a magnetic brush cleaning device 29, and other components. Upon detection by a mark sensor 13 of a synchronizing mark (not shown) on a side edge of the photosensitive body 4, various operative elements disposed around the photosensitive body 4 start operating at a predetermined timing sequence. First, the outer surface of the photosensitive body 4 is charged to a prescribed polarity by a charger 14. In this embodiment, the photosensitive body 4 is made of organic photosemiconductor (OPC), and hence is negatively charged by the charger 14. The light reflected from the entire lower surface of the original 2 illuminated by the light sources 3A, 3B is applied to an exposure surface of the photosensitive body 4 via a first mirror 15, a lens 16, and a second mirror 17, to focus the image of the original 2 on the exposure surface. In this manner, an electrostatic latent image corresponding to the image of the original 2 is formed on the surface of the photosensitive body 4. When the photosensitive body 4 rotates, the latent image goes into a developing device 18 by which it is developed into a visible image (i.e., a toner image) by toner. The toner is charged to a positive polarity which is opposite to the polarity to which the electrostatic latent image has been charged. Therefore, the positively charged toner is electrostatically attracted to the negatively charged latent image, thus forming the toner image.

The toner image thus formed is then moved into an image transfer unit 9. The sheet feeding unit includes sheet feeders 19, 20, 21 containing respective stacks of transfer members or sheets of different sizes. A selected one of the transfer sheets is fed in the direction of the arrow A, B, or C into the image transfer unit 9, and then electrically discharged by a transfer charger 22 on one side of the transfer sheet. The transfer sheet is also irradiated with light applied from an erase lamp 23 disposed on the inner side of the photosensitive body 4, whereupon the toner image is transferred from the photosensitive body 4 onto the transfer sheet. Then, the transfer sheet is separated from the photosensitive body 4. Where the roller 7 is of a small diameter, e.g., 26 mm, the transfer sheet can be separated of its own accord from the photosensitive body 4 due to the rigidity the transfer sheet possesses. In the illustrated embodiment, to allow the transfer sheet to be reliably separated from the photosensitive body 4, the transfer sheet is separated from the photosensitive body 4 by means of an AC separation charger 24.

The transfer sheet on which the toner image has been transferred passes through a fixing device 25 in the direction of the arrow D, in which the toner is fixed to the transfer sheet. Thereafter, the transfer sheet is discharged into a sheet tray 26 in the direction of the arrow E.

Figure 2:
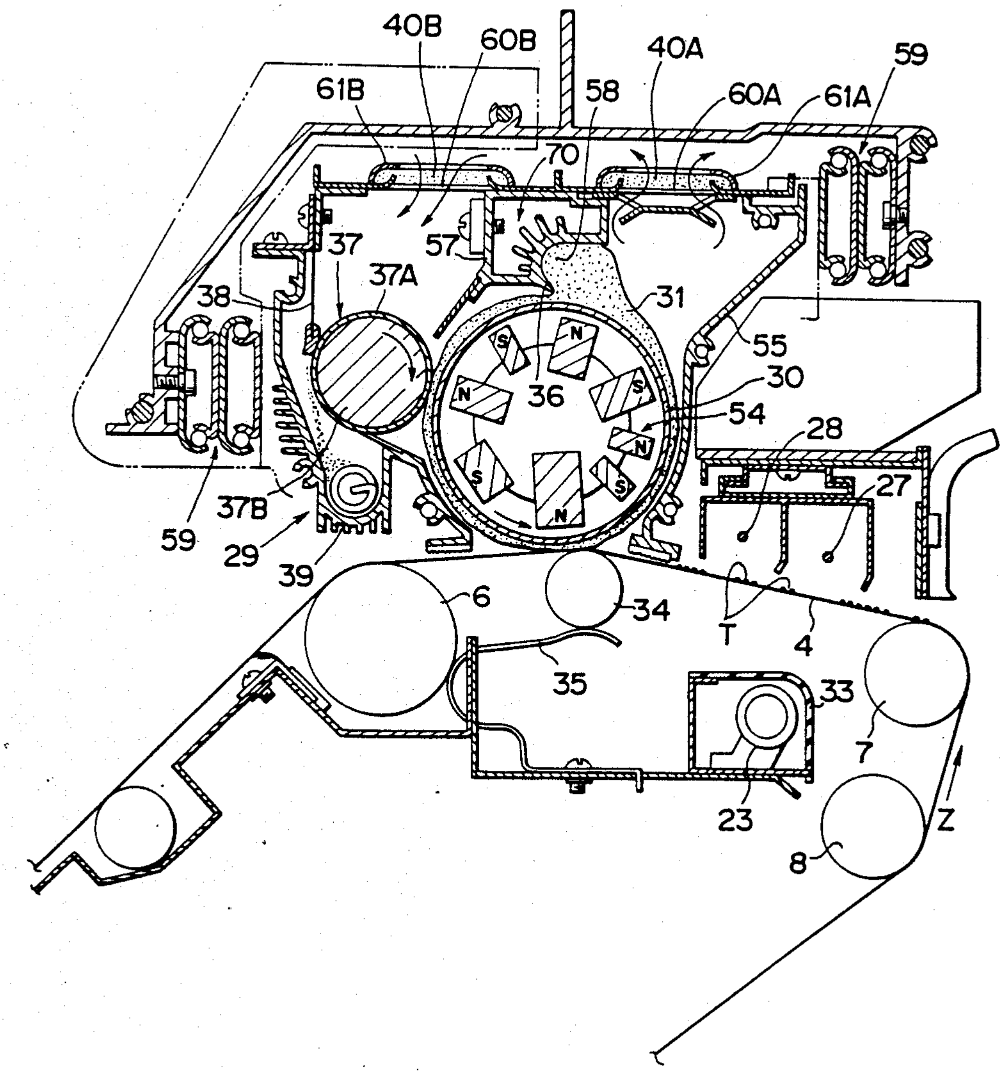
FIG. 2 is an enlarged vertical cross-sectional view of a magnetic brush cleaning device in the electrophotographic copying machine.

As also shown in FIG. 2, remaining toner T on the photosensitive body 4 after the toner image has been transferred is uniformly charged by a quenching charger 2 and a pre-cleaning charger 28, and then cleaned away by the cleaning device 29. The photosensitive body 4 is now readied for a next cycle of forming a toner image thereon.

The quenching charger 27 serves to erase the charges from the remaining toner T on the photosensitive body 4, and the pre-cleaning charger 28 serves to uniformly charge the remaining toner T positively. For example, a voltage of AC 8 KV is applied to the corona wire of the quenching charger 27, whereas a voltage of DC+6 KV is applied to the corona wire of the pre-cleaning charger 28. The remaining toner T after it has traveled past the chargers 27, 28 therefore carries positive electric charges.

Figure 3:
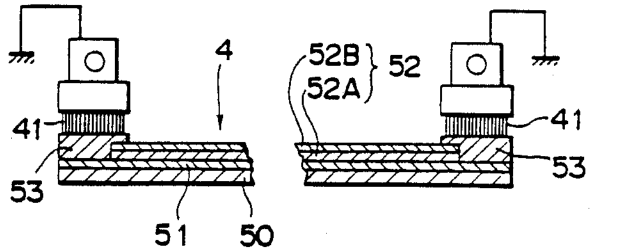
FIG. 3 is a fragmentary cross-sectional view of an endless-belt photosensitive body.

As shown in FIG. 3, the endless-belt photosensitive belt 4 comprises a photosensitive base 50 in the form of a polyester film having a thickness of 100 μ, an electrically conductive layer 51 in the form of an evaporated aluminum layer deposited on the base 50 and having a thickness ranging from 300 to 500 Å, an OPC layer (organic photosemiconductor layer) 52 deposited on the conductive layer 51, and electrically conductive coating layers 53 positioned on opposite sides of the OPC layer 52 and held in contact with the conductive layer 51, the coating layers 53 contacting grounded brushes 41 (see also FIG. 1), respectively. The OPC layer 52 comprises a CGL layer 52A having a thickness ranging from 300 to 500 Å and a CTL layer 52B having a thickness of 20 μ. The OPC layer 52 is made of a transparent OPC having a transmittance of about 10 to 20% with respect to light having a wavelength of 930 nm. By being irradiated with light from the erase lamp 23 (FIG. 2) from the reverse side of the photosensitive body 4, the photosensitive body 4 has increased transfer and cleaning efficiencies. The light from the erase lamp 23 is passed through a filter 33 (FIG. 2) which cuts off a shorter wavelength range to prevent the photosensitive body 4 from being deteriorated.

The magnetic brush cleaning device 29 shown in FIG. 2 is one example of a magnetic brush forming device in accordance with the present invention.

As described below, the magnetic brush forming device has a brush carrier for carrying an agent comprising a carrier and a toner, forming a magnetic brush of the agent as a layer, transferring the magnetic brush, and a limiting member for limiting or controlling the thickness of the layer carried on the brush carrier. In the illustrated embodiment, the brush carrier a cleaning sleeve 30 disposed in confronting relation to a counter roller 34 positioned on the reverse side of the photosensitive body 4, with the photosensitive body 4 extending between the cleaning sleeve 30 and the roller 34. The sleeve 30 is made of an electrically conductive nonmagnetic material, such as aluminum, for example.

The sleeve 30 is rotated counterclockwise (FIG. 2) about its own axis. Within the sleeve 30, there are disposed a plurality of (eight in the embodiment) magnets 54 fixed at their opposite ends and magnetized to have alternates S and N poles facing the sleeve 30.

A cleaning agent 31 containing a carrier and a toner is carried on the circumferential surface of the cleaning sleeve 30. The carrier comprises iron particles each having a diameter of about 100 μ and coated on its surface with a resin containing carbon. The toner comprises particles of a mixture of carbon powder and a resin, which have a diameter of about 10 μ. The cleaning sleeve 30 has a diameter of about 60 mm, for example, and about 630 g, for example, of the cleaning agent 31 is carried on the cleaning sleeve 30.

The cleaning agent 31 is carried on the circumferential surface of the sleeve 30 under the magnetic forces of the magnets 54. When the sleeve 30 is rotated, the cleaning agent 31 forms a magnetic brush and is transferred counterclockwise in FIG. 2. In this manner, the cleaning sleeve 30 serves as a brush carrier for carrying the cleaning agent 31 and transfers the cleaning agent 31 while forming a magnetic brush of the cleaning agent.

The counter roller 34 for guiding the photosensitive body or belt 4 is rotatably supported at its opposite ends by bearings (not shown) which are held by respective holders (not shown) held against side plates of a cleaning casing 55 by means of respective leaf springs 35. There is a gap or clearance defined between the counter roller 34 or the photosensitive body 4 and the cleaning sleeve 30. The gap between the cleaning sleeve 30 and the endless-belt photosensitive body 4 is selected to be 2.0 mm, for example.

Figure 4:
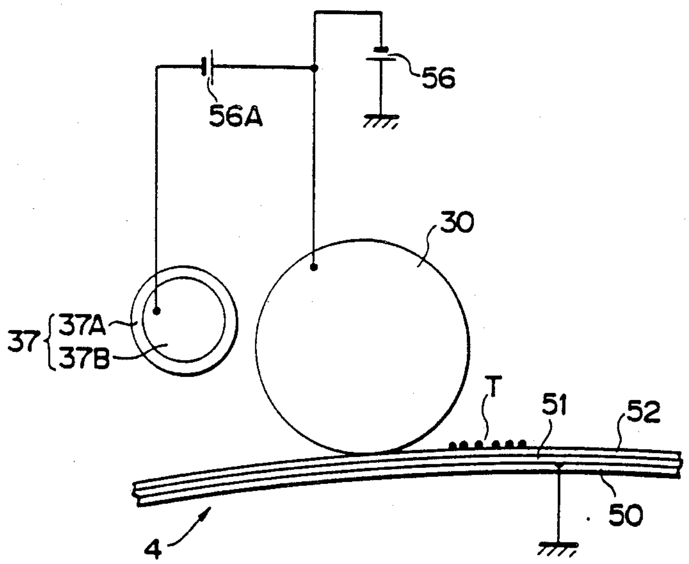
FIG. 4 is a view showing the manner in which voltages are applied respectively to a cleaning sleeve and a retrieval roller.

As shown in FIG. 4, a bias voltage is applied to the cleaning sleeve 30 by a sleeve bias power supply 56, the bias voltage being of the opposite polarity (i.e., negative in the embodiment) to the polarity to which the remaining toner T is charged by the chargers 27, 28, so that the carrier in the cleaning agent 31 is negatively charged. As the cleaning sleeve 30 is rotated, the carrier and the toner in the cleaning agent 31 are also triboelectrically charged to charge the carrier negatively.

While the cleaning sleeve 30 is rotated counterclockwise, the endless-belt photosensitive body 4 is moved in a direction against the direction of rotation of the cleaning sleeve 30 at point where the cleaning sleeve 30 and the photosensitive body 4 confront each other. At this time, the remaining toner T on the photosensitive body 4 is electrically attracted to the carrier which charged to the polarity opposite to that of the toner T. The remaining toner T is cleaned from the photosensitive body 4 in this manner.

The cleaning device 29 also includes a limiting member 57 (FIG. 2) for limiting or controlling the layer of the cleaning agent 31 by partly scraping the cleaning agent 31 carried and transferred by the cleaning sleeve 30. The limiting member 57 has in its lower portion a doctor blade 36 for actually regulating the thickness of the layer of the cleaning agent 31. The limiting member 57 has longitudinal ends fixed to front and rear side plates 55A, 55B (FIG. 5) of the cleaning casing 55 by means of screws or the like. It is however possible to integrally form the limiting member 57 with the cleaning casing 55. The doctor blade 36 has a tip edge spaced from the circumferential surface of the cleaning sleeve 30 by a gap of about 2.0, for example, so that the layer of the cleaning agent 31 is limited or regulated when it passes through that gap. The limiting member 57 has an agent receiving space 58 for receiving the cleaning agent scraped off by the doctor blade 36, the agent receiving space 58 being defined just upstream of the doctor blade 36 with respect to the direction of rotation of the cleaning sleeve 30.

The limiting member 57 is of a hollow structure having an inner space 70 therein. The inner space 70 and its associated arrangement of the limiting member 57 will be described in detail later on.

The remaining toner T which has been removed from the photosensitive body 4 is transferred while being attached to the carrier in the cleaning agent 31, and the toner in the cleaning agent 31 is retrieved by a retrieval roller 37 positioned adjacent to the cleaning sleeve 30 downstream of the doctor blade 36 with respect to the direction of rotation of the cleaning sleeve 30. At this time, not the entire toner is retrieved from the cleaning agent 31, but a certain amount of toner is left in the cleaning agent 31 and cooperates with the carrier in making up the cleaning agent 31.

The retrieval roller 37 comprises a metallic core 37B and an outer layer 37A covering the circumferential surface of the core 37B, the outer layer 37A comprising, for example, a thermally shrinkable tube of a dielectric such as a Teflon-base material. The retrieval roller 37 is spaced from the cleaning sleeve 30 by a gap of about 1.7 mm. The retrieval roller 37 is rotated clockwise in FIG. 2. To the core 37A, there is applied a voltage of the opposite polarity (negative in the embodiment) to the polarity to which the toner in the cleaning agent 31 is charged, for electrically attracting the toner in the cleaning agent 31 to the retrieval roller 37.

The toner which has electrically been attached to the outer circumferential surface of the retrieval roller 37 is scraped off by a scraper blade 38 with its tip edge pressed against the retrieval roller 37. The scraper blade 38 is, for example, in the form of a tip blade comprising a thin plate and a urethane tip fitted over the distal edge of the thin plate. The toner scraped off the retrieval roller 37 is then discharged out of the magnetic brush cleaning device 29 by an auger spring 39.

Filters 40A, 40B are fixed to an upper wall of the cleaning casing 55 by means of respective holders 61A, 61B. Air flows through the filters 40A, 40B and holes 60A, 60B defined in the upper wall of the cleaning casing 55 to keep the pressure in the casing 55 equal to the ambient pressure.

Figure 5:
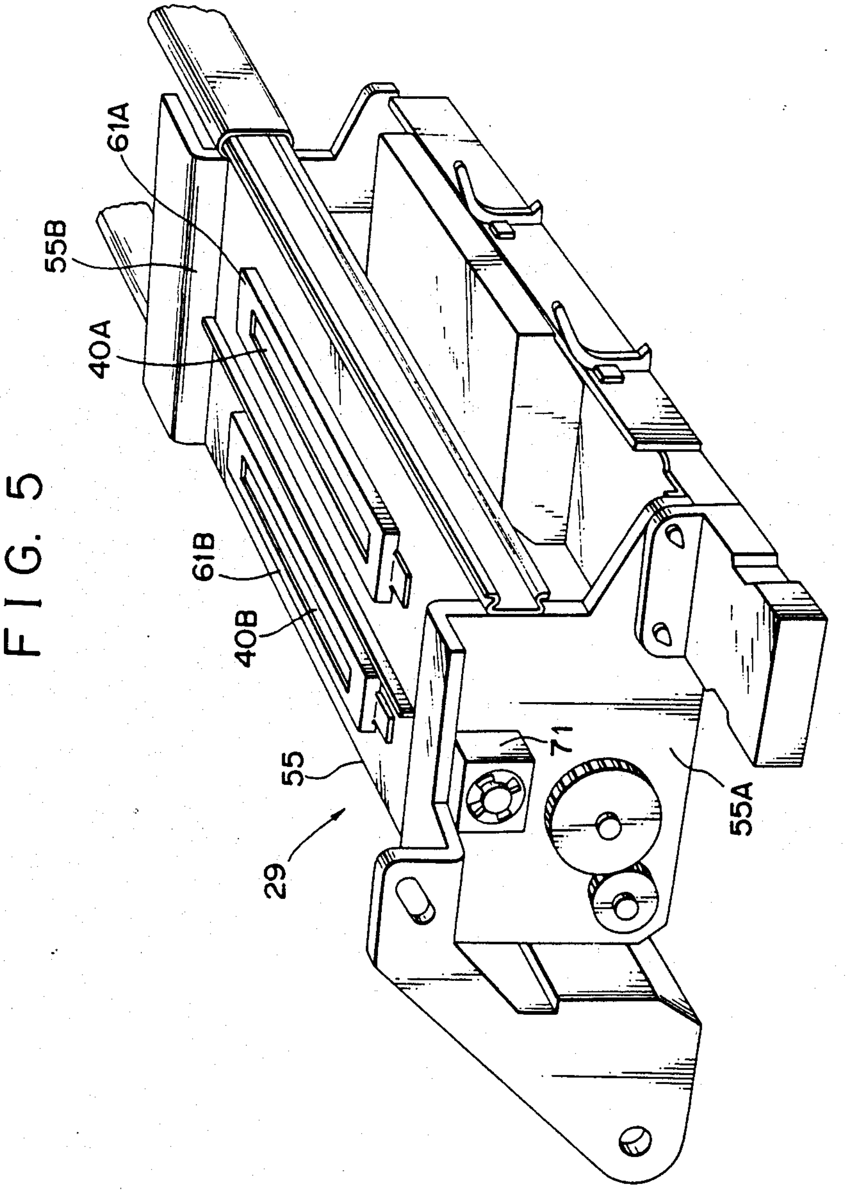
FIG. 5 is a perspective view of the magnetic brush cleaning device taken out of the electrophotographic copying machine.

The cleaning device 29 is laterally slidable out of and into the copying machine by means of slide units 59. FIG. 5 shows the cleaning device 29 as it is pulled out of the copying machine.

As described above, the cleaning agent 31 is carried and transferred by the cleaning sleeve 30, and scraped off by the doctor blade 36 of the limiting member 57. At this time, the cleaning agent 31 is squeezed by the doctor blade 36 and heat is generated by frictional contact between the cleaning agent 31 and the doctor blade 36. In the conventional cleaning devices, the temperature of the cleaning agent 31 is increased and the toner in the cleaning agent 31 is partly fused with time to the surfaces of carrier particles. More specifically, when the carrier and the toner roll on the cleaning sleeve while held in abrasive and frictional contact with each other, the toner tends to be fused to the carrier. When such thermal fusion occurs between the toner and the carrier, the cleaning capability of the cleaning agent 31 is lowered. The reasons for such a reduction in the cleaning capability will be described below for a better understanding of the present invention.

Figure 6:
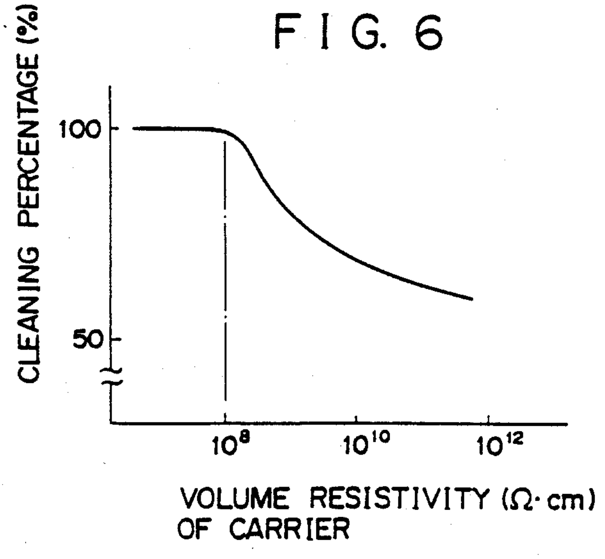
FIG. 6 is a graph showing the relationship between the volume resistivity of a carrier and the cleaning percentage.

In the magnetic brush cleaning device, the lower the volume resistivity of the carrier in the cleaning agent 31 carried on the cleaning sleeve 30, more precisely, the volume resistivity of at least the surfaces of the carrier particles, the more carrier particles in the outer layer of the cleaning agent 31 on the cleaning sleeve 30 are charged by the voltage applied to the cleaning sleeve 30 to increase an effective bias on the carrier in the outer layer of the cleaning agent 31, with the result that the carrier in the cleaning agent 31 can attract the remaining toner T under stronger electrostatic forces for a higher cleaning efficiency. Where the carrier is of the composition described above, the lower the volume resistivity of the carbon-mixed resin layer coated on each of the iron particles, the higher the cleaning efficiency. FIG. 6 is a graph illustrative of the relationship between the volume resistivity of the carrier and the cleaning percentage of the remaining toner on the photosensitive body 4. A study of FIG. 6 indicates that if the volume resistivity of the carrier particles is lower than $10^{10}$ Ω·cm, particularly $10^8$ Ω·cm, then the cleaning percentage is increased, and if the carrier volume resistivity is higher than $10^{10}$ Ω·cm, then the cleaning percentage is lowered. The cleaning percentage shown in FIG. 6 is given by the formula:

$$\frac{X - Y}{X} \times 100\ (\%)$$

where X (mg/cm²) is the amount of remaining toner which enters the cleaning device 29 and Y (mg/cm²) of the amount of remaining toner which has been left on the photosensitive body 4, i.e., has not been cleaned by the cleaning device 29.

However, if the volume resistivity of the carrier were too low, then the carrier and the toner in the cleaning agent 30 would be less triboelectrically charged, and the cleaning efficiency for cleaning the remaining toner T with the triboelectrically charged carrier would be lowered. Generally, the volume resistivity of the carrier should preferably be in the range from $10^6$ to $10^{10}$ Ω·cm, particularly from $10^6$ to $10^8$ Ω·cm.

Figure 7:
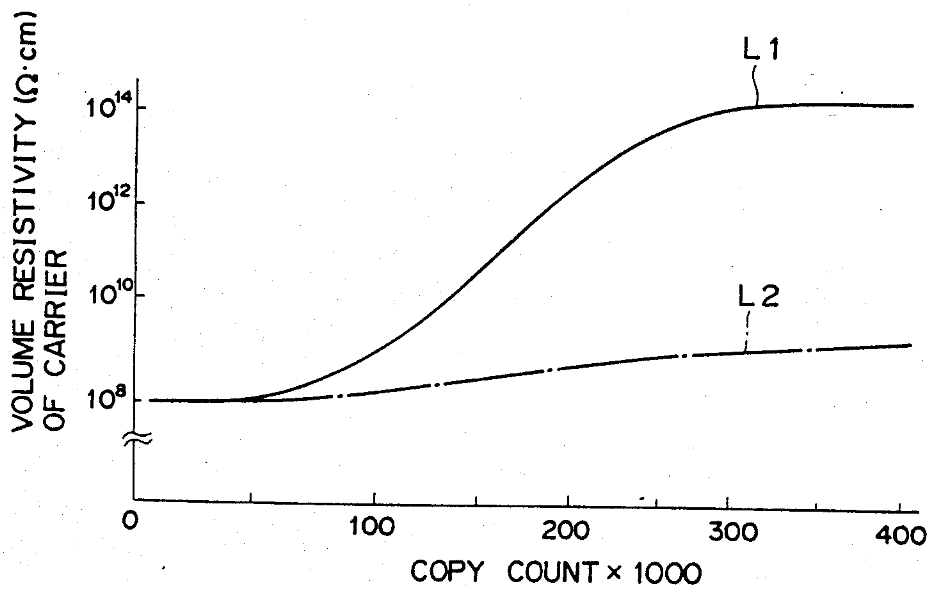
FIG. 7 is is a graph illustrating the relationship between the volume resistivity of the carrier and the copy count.

When the toner is thermally fused to the carrier particles in the cleaning agent 31, however, the volume resistivity (Ω·cm) of the surface of the carrier particles is significantly increased, and the cleaning capability thereof is lowered. FIG. 7 is a graph showing how the volume resistivity, which was initially $10^8$ Ω·cm, of the carrier in the cleaning agent is varied as the copy count increases, the graph indicating the volume resistivity on the vertical axis and the copy count on the horizontal axis. In the conventional cleaning device, the volume resistivity of the carrier sharply rises as the copy count increases as indicated by the curve L1 in FIG. 7, indicating that time-dependent thermal fusion of the toner and the carrier is rapidly developed. Heretofore, therefore, since the volume resistivity of the carrier rapidly increases and the cleaning capability decreases, the cleaning agent has to be replaced with a new cleaning agent when the copy count reaches about 150,000.

As can be understood from the above considerations, to allow the cleaning agent to be used for a long period of time, thermal fusion of the toner and the carrier should be reduced or suppressed, and hence the generation of heat in the cleaning device should be minimized to lower any increase in the temperature of the cleaning agent.

To reduce heat generation in the cleaning device 29, according to the present invention, the inner space 70 is defined in the limiting member 57 and extends over the entire length thereof in a direction normal to the sheet of FIG. 2. The front and rear side plates 55A, 55B (FIG. 5) have respective through holes (not shown) held in registry with the respective opposite ends of the inner space 70. Therefore, the inner space 70 is vented to atmosphere to allow air outside of the cleaning device 29 to flow into the inner space 70 for thereby cooling the limiting member 57.

As illustrated in FIG. 5, a small motor-driven fan 71 is mounted on the front side plate 55A over the through hole therein for forcibly sending outside air into the inner space 70 and discharging the introduced air out of the inner space 70 through the hole in the rear side plate 55B. Of course, the motor-driven fan 71 may be arranged to draw out air from the hollow space 70 therethrough. At any rate, since outside air flows through the inner space 70, the limiting member 57 is forcibly cooled. Accordingly, even when the temperature of the cleaning agent 31 is increased in the gap between the doctor blade 36 and the cleaning sleeve 30 by being squeezed by the limiting member 57, such a temperature increase is suppressed, or rather, the cleaning agent 31 present in the gap and also in the agent receiving space 58 is cooled by cooling the limiting member 57 as described above.

Figure 8:
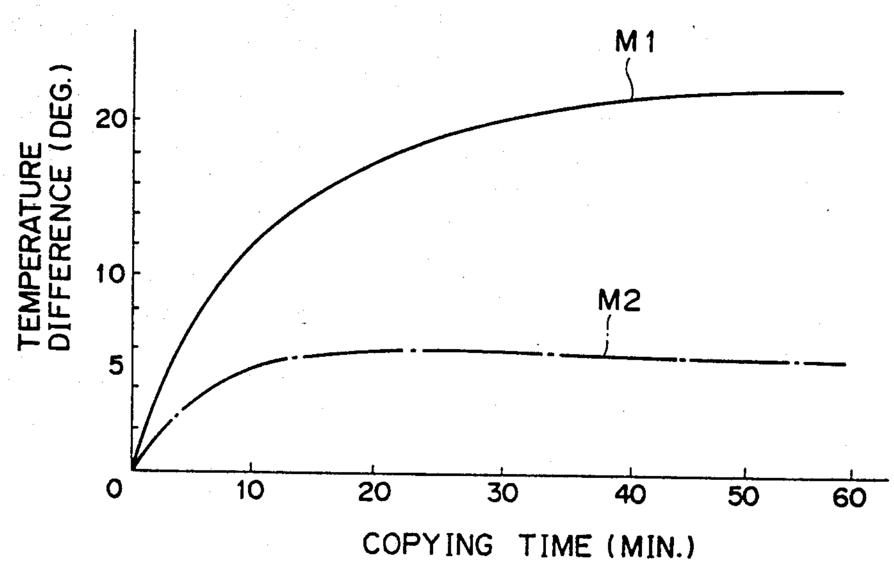
FIG. 8 is a graph showing the relationship between copying time and the temperature of a cleaning agent.

FIG. 8 shows the relationship between the temperature difference between the cleaning agent 31 and the ambient air, indicated on the vertical axis, and the copying time indicated on the horizontal axis. A curve M1 represents the relationship in a conventional cleaning device, whereas a curve M2 indicates the relationship between the cleaning device according to the present invention. The curve M1 clearly shows that with the conventional cleaning device, the temperature of the cleaning agent rapidly increases right after a copying operation is started, thus causing thermal fusion of the toner and the carrier at a higher rate as indicated by the curve L1 in FIG. 7. With the cleaning device of the invention in which the limiting member 57 is forcibly cooled, the temperature rise of the cleaning agent 31 is suppressed as indicated by a curve M2 in FIG. 8, with the result that the carrier volume resistivity is prevented from rising sharply as indicated by a curve L2 in FIG. 7 and hence thermal fusion of the toner and the carrier is suppressed. Consequently, the cleaning agent in the cleaning device of the invention can be used with a high cleaning efficiency sustained over a long period of time.

While the magnetic brush forming device of the invention has been described above as being embodied in the cleaning device, the present invention is also applicable to a magnetic brush developing device. In such an alternative, the brush carrier comprises a developing roller for magnetically carrying, on its outer circumferential surface, a developing agent comprising a toner and a carrier, with an additive added if necessary. The developing roller forms a magnetic brush of the developing agent and transfers the magnetic brush, while at the same time the thickness of a layer of the magnetic brush is limited or controlled by a limiting member. The limiting member is also of a hollow structure and is forcibly cooled to minimize thermal fusion of the toner and the carrier. By forcibly cooling the limiting member, unwanted toner deposits or "scumming" is prevented from occurring on the surface of a latent image carrier which carries a latent image that is to be developed into a visible image by the developing device.

The present invention is not limited to the illustrated embodiment, but may be modified in various ways. For example, the brush carrier such as the cleaning sleeve or the developing roller may be fixed against rotation, and the magnets disposed in the brush carrier may be rotated to transfer the cleaning agent or the developing agent. Alternatively, the cleaning sleeve or the developing roller and the magnets may be rotated together. The principles of the present invention are further applicable to cleaning device in an image generating apparatus which employs a drum-shaped photosensitive body or an image generating apparatus including a latent image carrier made of a dielectric. In such other applications, the polarity to which the photo-sensitive body or the latent image carrier is charged, the polarity to which the toner is charged to develop an image into a visible image, and the polarity of a bias voltage applied to the cleaning sleeve, may be varied dependent on the properties of the latent image carrier. While the cleaning sleeve is employed as a brush carrier in the illustrated embodiment, a belt may instead be employed as a brush carrier. Moreover, remaining toner on the photosensitive body or the latent image carrier may be cleaned by a plurality of brush carriers disposed in confronting relation to the latent image carrier.

Where the magnetic brush forming device of the invention is employed as the magnetic brush cleaning device 29 or as the developing device 18 in FIG. 1, the brush carrier itself may be combined with an air cooling means. According to such a modification, the magnetic brush developing device includes a rotational assembly, the brush carrier comprising a developing sleeve of a nonmagnetic material having opposite ends supported by a sleeve support means. The rotational assembly comprises a through member extending axially through the sleeve, a magnet on the through member, and a through member support means supporting opposite ends of the through member, the sleeve and the through member being relatively rotatable, and the opposite ends of the sleeve communicating with ambient air.

More specifically, the opposite outer ends of the sleeve are rotatably supported respectively on side plates, and the through member supports the magnet in a region within the sleeve, the axially opposite ends of the through member projecting out of the opposite ends of the sleeve and being fixed to the side plates.

One of the axially opposite ends of the through member has a narrow elongate hole defined &herein and having one end vented to atmosphere and the other end opening in communication with the interior of the sleeve axially inwardly of the through member support means.

Said one end of the through member projects through the corresponding side plate and is disposed in a recess defined in a stationary member. The gap between the recess and the end of the through member is closed by a seal member attached to the side plate. The recess is held in communication with a compressed air inlet for introducing cooling air into the recess.

Various embodiments based on the aforesaid construction will be described below.

Figure 9:
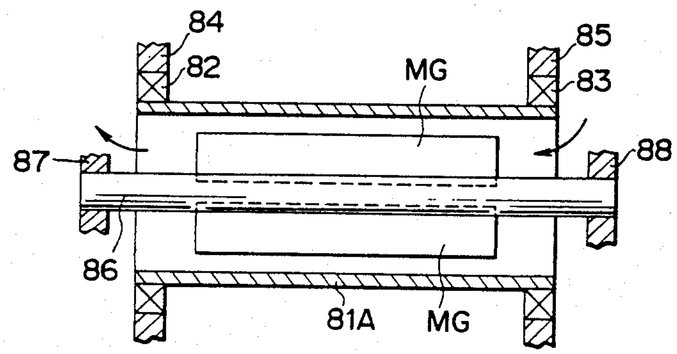
FIGS. 9 through 15 are fragmentary cross-sectional views of rotational member support assemblies according to different embodiments of the present invention.

FIG. 9 shows a brush forming device according to another embodiment of the present invention. A sleeve 81A has axially opposite ends which are rotatably supported at their outer circumferential portions in side plates 84, 85 by means of respective bearings 82, 83 serving as sleeve support means. A through member 86 comprising a magnet support shaft extends axially through the sleeve 81A and has axially opposite ends fixed to other side plates 87, 88 serving as through member support means. Magnets MG are mounted on the magnet support shaft 86.

The sleeve 81 is rotated about its own axis by a rotative drive means (not shown). The opposite ends of the sleeve 81A have no flanges which close the interior space of the sleeve 81A, but are open in communication with ambient air. Even when heat is produced on the sleeve 81A, such heat is radiated into air flowing through the sleeve 81A, and hence the sleeve 81A is prevented from being excessively heated.

Figure 10:
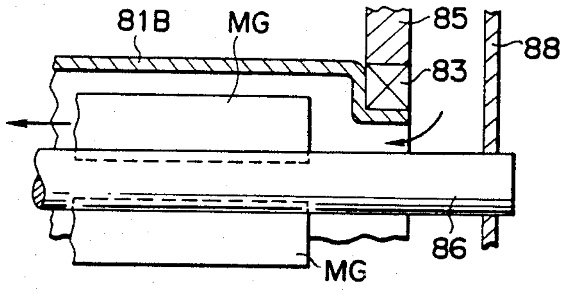

A brush forming device according to still another embodiment shown in FIG. 10 is basically the same as the brush forming device of FIG. 10 except that the axially opposite ends of a sleeve 81B are reduced in diameter by stepped portions.

Figure 11:
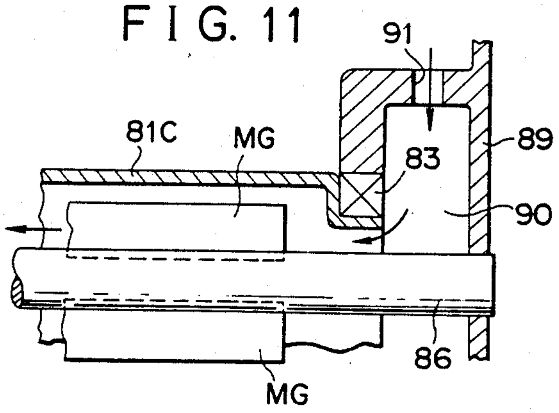

FIG. 11 illustrates a brush forming device in accordance with a still further embodiment of the present invention. In this embodiment, the side plates 85, 88 (FIG. 1) are integrally combined into a double-walled side plate 89 having an air chamber 90 communicating with the inner space in a sleeve 81C through one end thereof. The doublewalled side plate 89 has a lateral air passage 91 defined therein to allow the inner spaced in the sleeve 81C to be vented to atmosphere through the air chamber 90 and the passage 91. The other end of the sleeve 81C may be of an identical construction supported on an identical double-walled side plate, or may be of the same construction as that of the embodiment shown in FIG. 9. Air may be passed of its own accord through the sleeve 81C, but may be forcibly passed through the sleeve 81C to cool the same.

Figure 12:
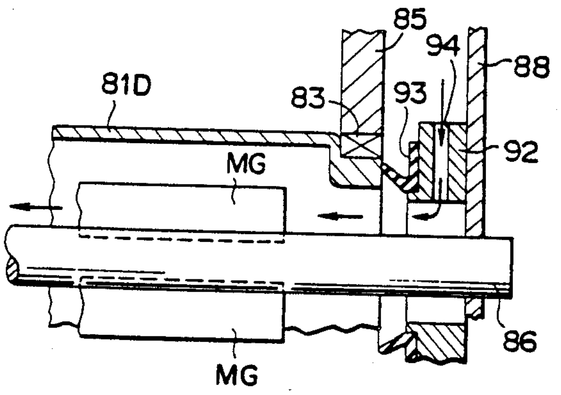

According to yet another embodiment shown in FIG. 12, a brush forming device is basically the same as the brush forming device shown in FIG. 10, with an additional arrangement. More specifically, a ring 92 is fixed to an inner surface of the side plate 88 in surrounding relation to the magnet support shaft 86, and a seal ring 93 having a V-shaped cross section is secured to a lateral surface of the ring 92. The seal ring 93 has a free axial end slidably held against the axial surface of one end cf a sleeve 81D to provide a hermetic seal on the end of the sleeve 81D. The ring 92 has a lateral air vent hole or passage 94 defined therein for drawing air flowing of its own accord or compressed air forcibly supplied from a compressed air source. The other end of the sleeve 81D may be of an identical construction supported on an identical double-walled side plate, or may be of the same construction as that of the embodiment shown in FIG. 9.

Figure 13:
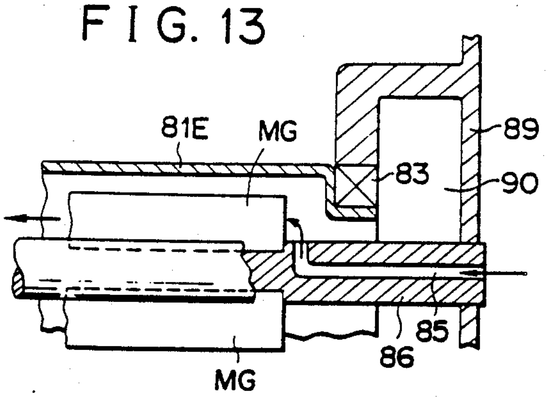

FIG. 13 illustrates a brush forming device according to a yet further embodiment of the present invention. A brush forming device shown in FIG. 13 is substantially the same arrangement as that of the brush forming device of FIG. 11, except that no passage or vent hole is defined in the double-walled side plate 89 to close the air chamber 90 which only communicates with the inner space of a sleeve 81E through one end thereof, and a narrow elongate hole 95 is axially defined in one axial end of the magnet support shaft 86. The narrow elongate hole 95 has one end vented to atmosphere and the other end opening into the sleeve 81E, thereby providing communication between the inner space of the sleeve 81E and the ambient air. The hole 95 serves to draw air flowing of its own accord or compressed air forcibly supplied from a compressed air source The other end of the sleeve 81E may be of an identical construction having an identical narrow elongate hole in the magnetic support shaft, or may be of the same construction as that of the embodiment of FIG. 9.

Figure 14:
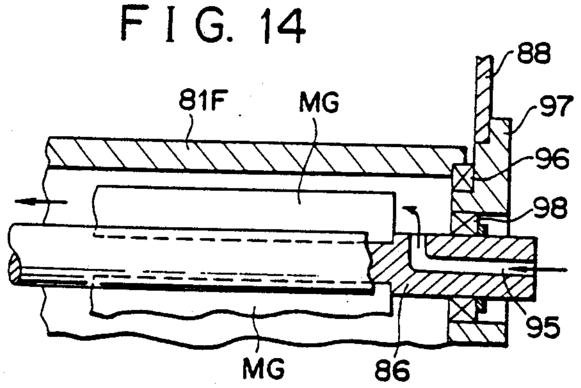

FIG. 14 shows a sleeve according to another embodiment for use in a cleaning device in a copying machine. A sleeve 81F has axially opposite ends each rotatably supported at its inner surface on a flange 97 by means of a bearing 96. The flange 97 is fixed to a side plate 88. The flange 97 has a central hole defined axially therethrough, and a magnet support shaft 86 is rotatably supported in the central hole by means of a bearing 98. The magnet support shaft 86 has a narrow elongate hole 95 defined axially therein. In this embodiment, both the sleeve 81F and the magnet support shaft 86 are rotatable. The narrow elongate hole 95 for supplying cooling air into the sleeve 81F extends axially through the bearing 98. Therefore, the hole 95 also serves to cool the bearing 98.

Figure 15:
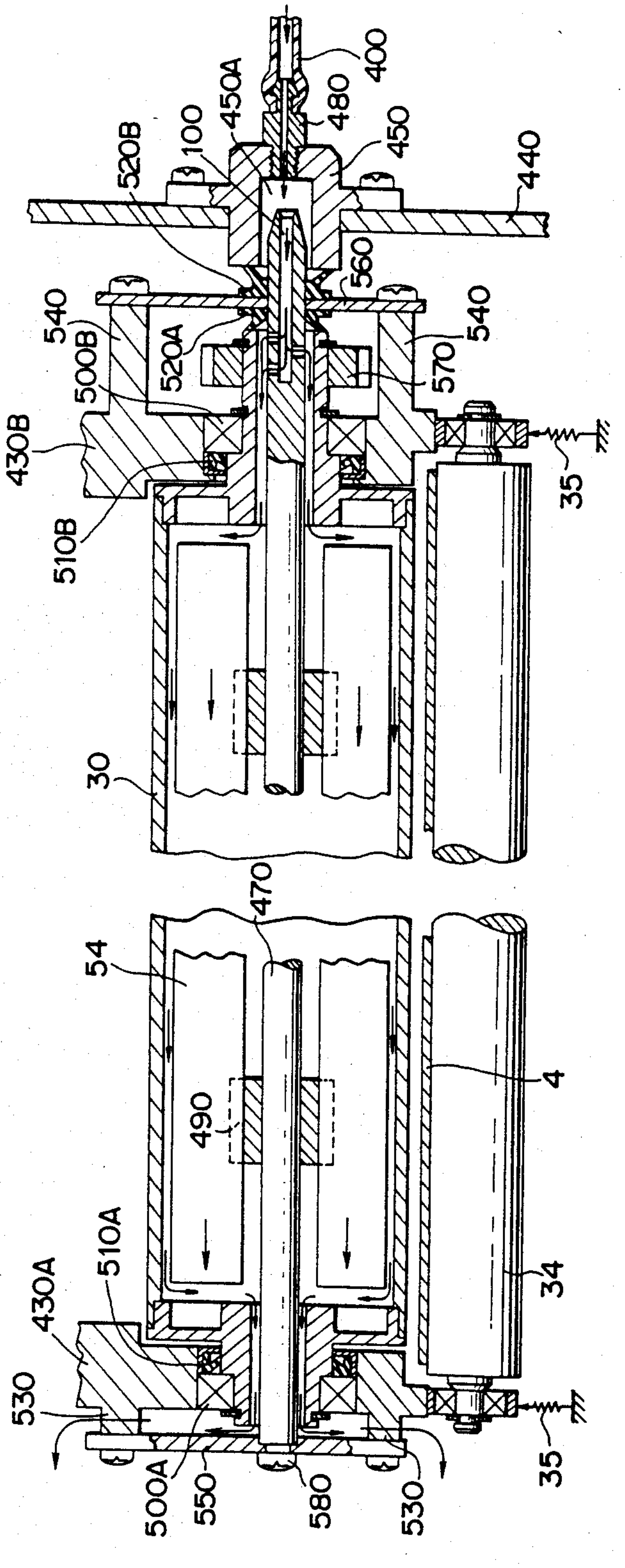
Figure 16:
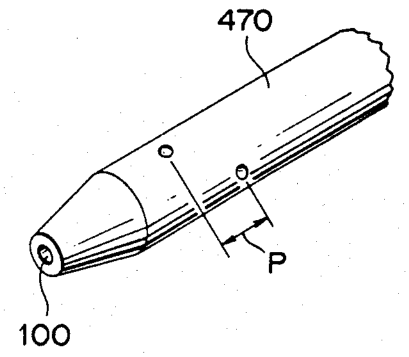
FIG. 16 is a perspective view of a magnet support shaft.
Figure 17:
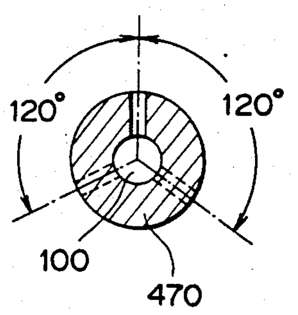
FIG. 17 is a transverse cross-sectional view of the shank of the magnet support shaft.

FIGS. 15 through 17 illustrate a brush forming device according to a yet further embodiment of the present invention. A sleeve 30 shown in FIG. 15 has its outer circumferential portion supported at axially opposite ends by front and rear bearings 500A, 500B in respective side plates 430A, 430B.

A magnet support shaft 470 is supported at one axial end by a bracket 550 which is fixed to three studs 530 (two shown) on the front side plate 430A and at the opposite axial end by a bracket 560 which is fixed to three studs 540 (two shown) on the rear side plate 430B. Magnets 54 are mounted on the magnet support shaft 470 by means of magnet holders 490. One of the axial ends of the magnet support shaft 470 is fastened to the bracket 550 by means of a screw 580, and the other end of the magnet support shaft 470 is simply supported by the bracket 560. The magnet support shaft 470 and the magnets 54 are held out of contact with the sleeve 30.

The rear axial end, shown as the righthand end, of the magnet support shaft 470 has an axial narrow elongate hole 100 defined therein and having one end opening at the end of the shaft 470. The other end of the hole 100 is also open into communication with the inner space of the sleeve 30 at a position inward of the bracket 560. As shown in FIGS. 16 and 17, the other end of the hole 100 is open through three radial ports extending perpendicularly to the axis of the hole 100 and angularly spaced by 120° and axially spaced by a pitch P. The ports are angularly and axially spaced to keep the shank of the magnet support shaft 470 mechanically strong and to allow air to be ejected uniformly from the hole 100. The rear axial end of the magnet support shaft 470 projects out of the rear side plate 430B and is fitted in a recess 450A defined in a bracket 450 secured to a stationary rear side plate 440 of an image generating apparatus.

Two seal rings 520A, 520B each of a V-shaped cross section are attached to opposite sides of the bracket 560, with the magnet support shaft 470 extending through the seal rings 520A, 520B. The seal ring 520A has a free axial end pressed against an end surface of the sleeve 30, whereas the seal ring 520B has a free axial end pressed against an end surface of the bracket 450 to provide a seal against air leakage.

The recess 450A is held in communication with the inner space of the sleeve 30 through the narrow elongate hole 100 without the danger of air leakage between the recess 450A and the sleeve 30. The sleeve 30 is rotated by an external drive source through a gear 570. Therefore, the free end of the seal ring 520A is held in sliding contact with the end surface of the sleeve 30. The free end of the seal ring 520B does not slide against the bracket 450 since the bracket 450 is stationary. The entire unit shown in FIG. 15, including the front and rear side plates 430A, 430B, is horizontally movable when it is installed in or removed from the image generating apparatus. When the entire unit is installed in place, the free end of the seal ring 520B is pressed against the bracket 450 to provide the seal.

A seal ring 510A is disposed in the front side plate 430A around the sleeve 30 and held against the front bearing 500A, and a seal ring 510B is disposed in the rear side plate 430B around the sleeve 30 and held against the rear bearing 500B. The seal rings 510A, 510B have radially inner portions slidably held against the outer circumferential surfaces of the sleeve 30 for preventing a cleaning agent from entering the bearings 500A, 500B to keep the bearings 500A, 500B from being locked.

A tubular fitting 480 for discharging compressed air is threaded in the bracket 450. The tubular fitting 480 is connected to one end a tube 460 the other end of which is coupled to an air compressor (not shown) for supplying compressed air into the recess 450A through the tube 460 and the fitting 480.

Introduced compressed air flows through the hole 100 into the sleeve 30 and then out of the sleeve 30, as indicated by the arrows, during which time the air cools the sleeve 30.

The sleeve 30 for performing a magnetic brush cleaning function is thus combined with an air cooling mean to prevent the cleaning capability from being lessened when the temperature of the sleeve 30 rises with time.

The advantages of cooling the sleeve 30 for desired cleaning performance can readily be understood from the operation and advantages of the hollow limiting member described above with reference to FIGS. 6 through 8.

More specifically, since a carrier on the sleeve 30 is of a magnetic material, carrier particles rise along lines of magnetic force generated by the magnets 54 in the sleeve 30, thus forming a magnetic brush on the sleeve 30. When the sleeve 30 is rotated with respect to the fixed magnets 54, the fibers of the magnetic brush roll and are agitated on outer circumferential surface of the sleeve 30. The magnetic brush is triboelectrically charged due to friction between the carrier and toner attached to the carrier to electrostatically attract remaining toner on a photosensitive body 4. The remaining toner to be removed from the photosensitive body 4 has been positively charged.

It is considered that the remaining toner can be cleaned from the photosensitive body 4 by the sleeve 30 based on the combination of the following three actions:

The first action is the attraction of the positively charged remaining toner to the negatively charged sleeve 30 under electric forces produced by a bias voltage applied which is applied to the sleeve 30 by the bias voltage applying means. The toner thus attracted to the sleeve 30 is then transferred to the retrieval roller under a bias voltage applied thereto.

The second action is the attraction of the remaining toner to the carrier which is charged by triboelectric charging of the carrier and the toner.

The third action is the mechanical removal of the remaining toner with the magnetic brush which is brought into contact with the remaining toner on the photosensitive body.

When the temperature of the sleeve 30 is increased, the first and third actions are lessened to the point where they fail to attract the remaining toner. The cleaning ability of the third action is very limited and small. Therefore, an increase in the temperature of the sleeve 30 is detrimental to the cleaning performance of the sleeve 30.

The sleeve 30 is heated because the magnet roll is heated for the reasons described above in the description of the conventional magnetic brush forming devices. Therefore, it would be difficult to remove the source of heat.

The heat caused by an eddy current may be reduced to a certain extent. For example, an eddy current flowing through the sleeve 30 can be reduced by making the sleeve 30 of stainless steel (e.g., SUS304) having a larger electric resistance than aluminum, and making the thin sheet of the sleeve 30 about 0.8 mm thick to reduce the cross-sectional area of the thin sheet which passes through the magnetic path, thereby reducing the amount of a current flowing through the thin sheet.

Even with such an arrangement, however, the heat itself caused by an eddy current cannot be eliminated. The various air-cooling structures of the present invention are highly effective in cooling the sleeve 30.

The relationship between an increase in the temperature of the sleeve and a reduction in the cleaning capability is equivalent to the relationship between an increase in the electric resistance of the carrier and a reduction in the cleaning capability. More specifically, when the temperature of the sleeve is increased, the electric resistance of the carrier is increased, and the sleeve bias power supply 46 shown in FIG. 4 becomes less effective, resulting in a reduction in the cleaning capability.

When the temperature of the sleeve is increased, the carrier and the toner are thermally fused to lower the ability of the carrier to attract the remaining toner. This then causes the friction of only toner particles, with the result that the second action, referred to above, becomes insufficient.

The air-cooling structures shown in FIGS. 9 through 17 may be incorporated in the sleeve or brush carrier in a magnetic brush developing device.

As described above, a developing agent for use in the magnetic brush developing device comprises, as with the cleaning agent, a carrier and a toner. The carrier is made of a magnetic material, i.e., iron particles each having a diameter of about 100 $\mu$ and coated on its surface with a resin containing carbon. The toner comprises particles of a mixture of carbon powder and a resin, which have a diameter of about 10 $\mu$. Therefore, when the developing agent is heated, the carrier and the toner tend to be thermally fused.

Although certain preferred embodiments have been shown and described, it should be understood that many changes and modifications may be made therein without departing from the scope of the appended claims.

I claim:

1. A magnetic brush forming device for use in an image generating apparatus, comprising:

a brush carrier for carrying an agent containing a carrier and a toner and transferring the agent while forming a magnetic brush of the agent;

a limiting member for limiting the thickness of a layer of said agent carried on said brush carrier, said limiting member being of a hollow structure for allowing air to flow therein;

wherein said brush carrier serves as a component in a rotational assembly in a magnetic brush developing device and comprises a sleeve of a non-magnetic material having opposite ends supported by sleeve support means, said rotational assembly comprising a through member extending axially through said sleeve, a magnet on said through member, and through member support means supporting opposite ends of said through member, said sleeve and said through member being relatively rotatable, and said opposite ends of said sleeve communicating with ambient air; and wherein said opposite ends of said sleeve are rotatably supported respectively on side plates, said magnet being mounted on said through hole in a region thereof positioned within said sleeve, said opposite ends of said through member projecting out of said opposite ends and being fixed to said lateral plates.

2. A magnetic brush forming device according to claim 1, wherein said limiting member serves as a component in a magnetic brush cleaning device.

3. A magnetic brush forming device according to claim 2, wherein said brush carrier serves as a component in a rotational assembly in said magnetic brush cleaning device and comprises a sleeve of a nonmagnetic material having opposite ends supported by sleeve support means, said rotational assembly comprising a through member extending axially through said sleeve, a magnet on said through member, and through member support means supporting opposite ends of said through member, said sleeve and said through member being relatively rotatable, and said opposite ends of said sleeve communicating with ambient air.

4. A magnetic brush forming device according to claim 1, wherein said limiting member serves as a component in a magnetic brush developing device.

5. A magnetic brush forming device according to claim 4, wherein said brush carrier serves as a component in a rotational assembly in said magnetic brush developing device and comprises a sleeve of a nonmagnetic material having opposite ends supported by sleeve support means, said rotational assembly comprising through member extending axially through said sleeve, a magnet on said through member, and through member support means supporting opposite ends of said through member, said sleeve and said through member being relatively rotatable, and said opposite ends of said sleeve communicating with ambient air.

6. A magnetic brush forming device according to claim 1, wherein said through member has a narrow elongate hole defined in one of said opposite ends thereof, said narrow elongate hole having one end vented to atmosphere and the opposite end communicating with the interior of said sleeve axially inwardly of said through member support means.

7. A magnetic brush forming device according to claim 6, wherein said one of the opposite ends of said through member projects through the corresponding side plate and is disposed in a recess defined in a stationary member, further including a seal member attached to said corresponding side plate and closing said recess around said one of the opposite ends of said through member.

8. A magnetic brush forming device according to claim 7, wherein said stationary member has a compressed air inlet opening into said recess.

9. A magnetic brush forming device for use in an image generating apparatus, comprising:

a sleeve of a non-magnetic material having opposite ends supported by sleeve support means, magnets disposed in said sleeve, means for relatively rotating said sleeve and said magnets around one axis, a magnetic brush formed around said sleeve and being moved together with said sleeve, a through member extending axially through said sleeve and supporting said magnets in said sleeve, ventilators formed at one end of said through member to pass air to said sleeve, means for supplying air to said ventilator, and another ventilator formed at the other end of said through member to exhaust air from said sleeve.

10. A magnetic brush forming device according to claim 9, wherein a seal ring is disposed between one end of said through member and one end of said sleeve so as to prevent air from entering into said sleeve.

11. A magnetic brush forming device according to claim 9, wherein said ventilators are formed around a periphery of said through member at equal angles.

12. A magnetic brush forming device according to claim 9, wherein said through member is freely rotatable of which one end is positioned in a recess of a bracket disposed on a side plate, and a seal ring is disposed between said bracket and said through member.

* * * * *